W. S. HOW.
Dredge or Spice Boxes.
No. 156,088.　　　　　　　　　　　　　　Patented Oct. 20, 1874.
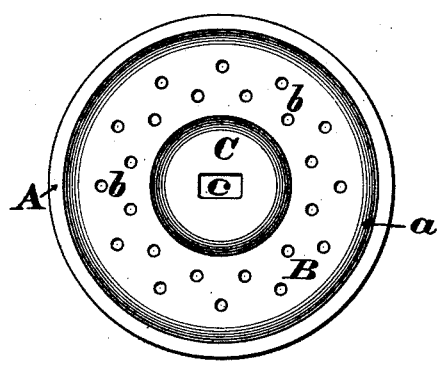
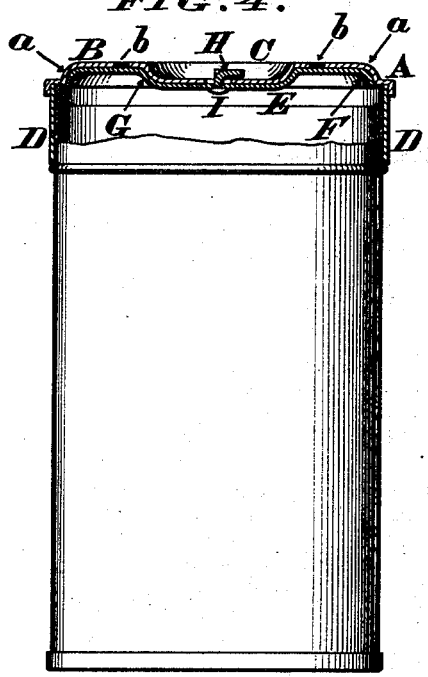
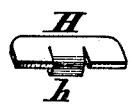
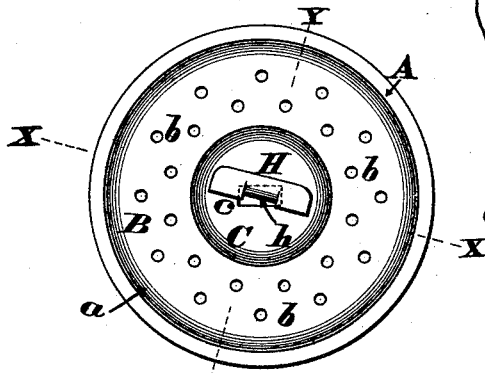
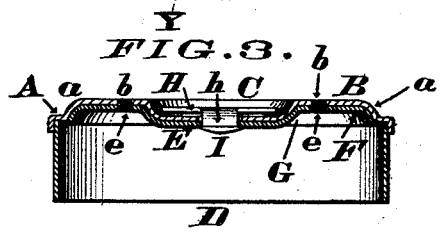
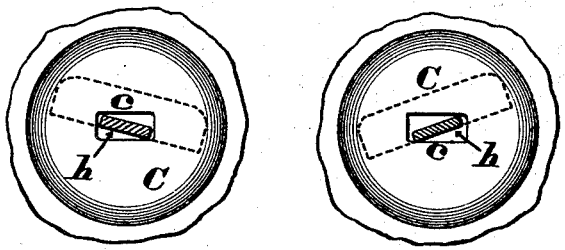
Woodbury Storer How
By Knight　att'ys.
Attest.
J. H. Layman,
Walter Allen

UNITED STATES PATENT OFFICE.

WOODBURY STORER HOW, OF CINCINNATI, OHIO.

IMPROVEMENT IN DREDGE OR SPICE BOXES.

Specification forming part of Letters Patent No. 156,088, dated October 20, 1874; application filed December 26, 1873.

*To all whom it may concern:*

Be it known that I, WOODBURY STORER HOW, of Cincinnati, Hamilton county, Ohio, have invented a new and useful Improvement in Dredge or Spice Boxes, of which the following is a specification:

This invention relates to those sheet-metal boxes whose lids, caps, or covers are perforated in order that the contents of the box may be sifted or sprinkled out in a fine shower; and my improvement consists solely in providing the rotating "cut-off" of said perforated covers with a peculiarly constructed turn-bar or button. Owing to the construction of this button the cut-off is capable of being rotated, so as to bring its perforations in line with those of the lid proper, when it is desired to sprinkle out the contents of the box, or said button may be turned so as to present its solid or blank spaces opposite the apertures in the cover, thereby preventing any escape of the contents. The aforesaid button being located within a pit or depression in the lid proper is protected from any accidental disturbance, and therefore not liable to be unintentionally shifted, so as to allow the contents of the box to be spilt or injured by excavation, &c.

Figure 1 is a plan view of the lid, cut-off, and turn-bar or button detached from each other. Fig. 2 is a plan of the complete lid or cover. Fig. 3 is a vertical section through the lid at the line $x\ x$, the cut-off being turned so that its perforations will coincide with those of said lid. Fig. 4 is a vertical section at the line Y Y, the lid being shown applied to the box, and the cut-off shifted so as to prevent the escape of the contents. Fig. 5 are two diagrams on an enlarged scale, showing the open and closed conditions of the turn-bar; and Fig. 6 represents a modification of the turn-bar.

The lid of the flour or spice box consists, essentially, of an annular rim, A, an elevated and annular ledge, B, and a central circular pit or depression, C. Of the above members the rim A has the valance D soldered to it, while the annular ledge B is pierced with a number of suitable sized apertures, $b$. The rim A is joined to the ledge B by a curved shoulder, $a$. The pit C is provided with an oblong slot, $c$, for a purpose which will presently appear. Adapted to fit up snugly against the under side of lid A $a$ B C is a disk-shaped cut-off plate, E, having a downwardly-curved flange, F, and a pit, G, which is adapted to rotate around the circular depression C of said lid. The cut-off is provided with apertures or perforations $e$ of the same size as the ones $b$ of the lid, and disposed in the same manner in order that they may coincide or be in line with one another, when desired. The aforesaid pit G has a narrow slit, $g$, cut in it to receive the tongue $h$ of the button or turn-bar H, which latter may be composed of sheet metal of any suitable thickness. This tongue is formed by simply making two transverse and parallel incisions in the button H, and then trimming down the intervening portion, as clearly shown in Fig. 1.

To apply the cut-off in its proper position to the lid, it is only necessary to place the latter upon the former, insert the tongue $h$ through the slot $c$ and slit $g$, and then secure said tongue to the cut-off by solder I, as represented in Figs. 3 and 4.

As the tongue $h$ fits accurately within the slit $g$, and is soldered to the cut-off, it will be seen that any turning of the button H, either to the right or left, will impart a corresponding movement to the plate E, which turning of the button is permitted by the slot $c$.

This slot, it will be observed, is oblong, not square or circular, and as its width is somewhat less than the length of the tongue $h$ no complete rotation of said tongue can be effected. By this arrangement the sides of the slot $c$ act as stops to limit the rotation of the tongue.

When it is desired to use the dredge-box the button H is turned, as shown in Figs. 2 and 3, and in the left diagram of Fig. 6, which act causes a corresponding rotation of the cut-off E, thereby bringing its perforations $e$ in line with the apertures $b$ of the lid. This coincident position of the two sets of apertures is shown in Fig. 3. To close the lid, so as to prevent spillage or escape of aroma, the button is turned in an opposite direction, as represented in the right diagram of Fig. 6, which act rotates the cut-off, so as to bring its solid metal or blank spaces directly under the apertures $b$, as seen in Fig. 4.

Owing to the snug manner in which the cut-off bears against the lid, and also to the fitting of the flange F into the curved shoulder $a$, there is no opportunity for the contents of the box to escape between said lid and its cut-off. The operating button H, being located in the pit C and below the level of the ledge B, does not project so as to be liable to be accidentally struck and turned, thereby unintentionally opening the cut-off, which advantage will render my improved lid especially adapted for application to boxes for transportation.

Fig. 6 shows a strip of tin folded to form a turn button, H′, with the free ends forming a tongue, $h'$, one member of which is longer than the other to afford facility for inserting the tool, which will turn the ends down upon the cut-off and bind it to the cover without soldering, as shown at $h''$, Fig. 6, which cheapens the construction of the cover.

I claim as new and of my invention—

The cover constructed with a shouldered rim, A, a flat annular perforated ledge, B, and a central pit or depression, C, provided with an oblong opening, $c$, in combination with the perforated cut-off E F G, arranged within the cover A B C, and the turn-bar H having a flat shank, $h$, attached to the cut-off and passing through the slot $c$, as and for the purpose specified.

In testimony of which invention I hereunto set my hand.

WOODBURY STORER HOW.

Attest:
S. B. SPEARS,
GEO. H. KNIGHT.